United States Patent
Mahidhara (12)

(10) Patent No.: US 8,881,838 B2
(45) Date of Patent: Nov. 11, 2014

(54) HORSESHOE WITH SPLAYING FEATURE AND FLEXIBILITY

(76) Inventor: Murali Mahidhara, Pittsburgh, PA (US)

(*) Notice: Subject to any disclaimer, the term of this patent is extended or adjusted under 35 U.S.C. 154(b) by 0 days.

(21) Appl. No.: 13/385,172

(22) Filed: Feb. 4, 2012

(65) Prior Publication Data

US 2012/0168183 A1    Jul. 5, 2012

Related U.S. Application Data

(63) Continuation-in-part of application No. 13/261,128, filed as application No. PCT/US2010/003264 on Dec. 31, 2010, now abandoned.

(51) Int. Cl.
*A01L 1/02* (2006.01)
*A01L 3/02* (2006.01)
*A01L 7/02* (2006.01)

(52) U.S. Cl.
CPC ... *A01L 3/02* (2013.01); *A01L 1/02* (2013.01); *A01L 7/02* (2013.01)
USPC .................................................. 168/6; 168/4

(58) Field of Classification Search
USPC ............................................. 168/4, 6, 7, 8, 9
See application file for complete search history.

(56) References Cited

U.S. PATENT DOCUMENTS

| | | | |
|---|---|---|---|
| 585,992 A | 7/1897 | Walker | |
| 800,239 A * | 9/1905 | Paul | 168/8 |
| 985,249 A | 2/1911 | Butschko | |
| 1,476,867 A * | 12/1923 | Wunderlich | 168/13 |
| 2,021,217 A * | 11/1935 | Anderson et al. | 168/13 |
| 2,466,074 A * | 4/1949 | Bell | 168/29 |
| 2,622,685 A * | 12/1952 | Dixon | 168/13 |
| 3,090,718 A * | 5/1963 | Dixon | 168/7 |
| 3,548,947 A * | 12/1970 | Mackay-Smith | 168/29 |
| 4,573,538 A | 3/1986 | Figueras | |
| 4,967,492 A | 11/1990 | Rosen | |
| 5,566,765 A | 10/1996 | Ovnicek | |
| 5,727,633 A | 3/1998 | Ovnicek | |
| 6,076,607 A * | 6/2000 | Bergeleen | 168/4 |
| 6,263,973 B1 * | 7/2001 | Bergeleen | 168/4 |
| 6,467,548 B1 | 10/2002 | Rynningen | |
| 2005/0034877 A1 * | 2/2005 | Bergeleen | 168/6 |

* cited by examiner

*Primary Examiner* — Rob Swiatek
*Assistant Examiner* — Lisa Tsang
(74) *Attorney, Agent, or Firm* — Rama Nath

(57) ABSTRACT

A horseshoe with splaying and flexibility features has a U shaped compliant metallic unitary body having left and right wings and a central integral toe area which forms a compliant leaf-spring disposed proximate to or as part of the toe area. The leaf-spring may be crescent shaped and resiliently deforms exerting pressure sideways thus causing splaying of the wings. The leaf-spring may have a groove on either side to assist farrier-preparation during horseshoe sizing. The leaf-spring forms a cavity in use, which is optionally filled with a resilient material, e.g., silicone, to prevent accumulation of dirt/debris in the cavity. Optional contiguous serrations on the left and right wings provide relative vertical flexibility of the left and right wings. The splaying and flexibility enhance horse-hoof comfort and hoof-structure regeneration. The horseshoe may be cast/forged, blanked, or welded or produced by mechanical joining. Preferably, the horseshoe comprises hardened spring steel.

19 Claims, 6 Drawing Sheets

HORSESHOE WITH SPLAYING FEATURE AND FLEXIBILITY

RELATED APPLICATIONS

This application is a Continuation in Part of U.S. application Ser. No. 13/261128, having a filing date of Jan. 9, 2012, the contents of which are incorporated herein by reference.

FIELD OF THE INVENTION

The present invention is directed to a horseshoe, and more particularly to a horseshoe which is relatively inexpensive and provides a splaying feature as well as flexibility, to promote hoof-comfort and hoof structure regeneration for the horse.

BACKGROUND OF THE INVENTION

It has been the object of many horseshoe designers and farriers to provide a horseshoe which is hoof-friendly and which mimics to some extent the movement of a horse's hoof when the horse is walking or running, especially on a hard surface. Various attempts have been made over decades to obviate the rigidity of conventional metallic horseshoes by introducing nonmetallic elements that provide selected degrees of flexibility and resilience.

Prior art includes examples of horseshoe designs incorporating shock absorbing materials (such as for example in U.S. Pat. No. 5,348,098,) either in layers with metallic components or otherwise, without any provision for splaying. There are also examples of flexible horseshoe design in prior art, without any provision for splaying. U.S. Pat. Nos. 6,076,607, 4,513,824, 4,333,532, and 3,628,608 are examples of flexible horseshoes. U.S. Pat. No. 6,810,962 describes a composite horseshoe with a resilient intermediate layer to fill out interspaces between rigid upper and lower parts.

There are also specialty type horseshoe designs in prior art to address specific design needs but not splaying. For example, U.S. Pat. No. 5,727,633 to Ovnicek describes a horseshoe designed for lame horses and has a closed end toe section provided with a concave depression sufficient to avoid contact with the sole of a horse's foot beneath the tip of the coffin bone. The Ovnicek patent describes essentially a "combination" of hoof pad (which is preferably wedge-shaped) with a frog insert and a horseshoe element which raises the horse's heel, to assist a lame horse. It also seems essential in the Ovnicek patent that in order for the "combination" to be effective, the elevated heels and the frog insert must be elongated (vide column 2 of the Ovnicek patent). Notably, the Ovnicek patent provides for no flexibility between left and right wings of the horseshoe, and no such flexibility seems envisaged therein.

U.S. Pat. No. 6,076,607 (Bergeleen) describes a composite horseshoe having left and right body portions and a selectable detachable and interchangeable centerpiece in the toe region, enabling the flexibility of the shoe to be adjusted as desired. The selected centerpiece is provided with tapped holes extending horizontally one on each side and is assembled and held in place by screws inserted in the left and right body portions. The horseshoe in this prior art patent is described as being provided with antisplay flanges which however need to be assembled, thus increasing the cost of using this type of prior art horseshoe.

U.S. Pat. No. 6,082,462 (to Lyden) describes a composite horseshoe which is made of flexible and relatively inflexible materials and which can include a resilient pad for attenuating shock and vibration. U.S. Pat. No. 6,443,232 describes a horseshoe having shock-absorbing qualities, the shoe having a resilient polymer that is sandwiched between metal plates. Yet another horseshoe described as having adherence and a grip over any kind of ground is seen in U.S. Pat. No. 5,988,288 (to Bourdieu), wherein, a rigid core piece may be partially coated with or encased in a rubber compound.

U.S. Patent-publication 2005/0034877 A1 to Bergeleen, dated Feb. 17, 2005 provides a horseshoe that comprises a body made of a molded, flexible polyolefin plastic such as molded ultrahigh molecular weight polyethylene (UHMWPE) or polypropylene, the body having a separate spring metal insert shaped similar to the horseshoe body, enabling the shoe to expand. The horseshoe in the foregoing preliminary publication 2005/0034877 A1 includes a molded-in perforated screen or mesh of steel, spring steel or other metal embedded in the horseshoe-body to add rigidity to the shoe and to constrain the shoe to movement in one plane. The spring metal insert in this prior art composite design is described as sufficiently strong as to pull the UHMWPE body back into its original configuration when weight on the hoof is relieved.

U.S. Pat. No. 985,249 to Butschko (dated Feb. 28, 1911) teaches a horseshoe comprising a flexible metal core and a sectionalized body cast there-around with spaces between sections. Butschko's horseshoe includes a toe-calk and heel calks, which appear to be provided to prevent the horse from slipping and to get a grip. The toe-calk and the heel-calks are in the form of downward projections. U.S. Pat. No. 585,992 (dated Jul. 6, 1897) to Walker teaches a horseshoe wherein the toe or crown portion of the horseshoe has a first transverse slit and further slits extending in lateral directions from the inner end of the first transverse slit. Walker teaches that the slits permit yielding action. Further, U.S. Pat. No. 4,573,538 to Figueras (dated Mar. 4, 1986) teaches a horseshoe comprising a sole plate and having a central hollow zone which can be inflated by injecting (—using a valve—) a compressed fluid. The horseshoe of Figueras is said to provide functions of slip-proofing and damping.

It has however been found that the prior art horseshoe designs which provide resilience may be composite, or use several parts and components, and do not offer simplicity, reliability or cost effectiveness. Those prior art horseshoes which by design use predominantly resilient material, are invariably generally less durable (—short life—) than the conventional rigid metallic designs which might however restrict expansion and thus create increased stress in the hoof and legs of the horse, particularly during racing Despite the availability of horseshoe designs providing shock absorption, flexibility and such features, there is still a need for a horseshoe design which is characterized by simplicity, economy and including controlled splaying without any need for a multiplicity of components and without the need for assembly of parts. The present invention intends to obviate complexity and certain less desirable aspects of prior art horseshoe design and provides a relatively less expensive and very simple design which aims at causing and allowing the much desired splaying for mitigating hoof-stress particularly during racing. The present invention also aims at providing structural features in the horseshoe to promote hoof-comfort and consequent hoof-wall-growth and hoof structure regeneration.

SUMMARY OF THE INVENTION

The present invention provides a simple and economical horseshoe design, unitary in construction and preferably of metallic material, which causes and supports splaying and flexibility, thus permitting natural hoof expansion in use, for the horse, enabling improved blood circulation in the hoof area and reducing hoof-stress which is otherwise caused in prior art conventional-type rigid horseshoes. Additionally, the present invention provides a horseshoe which is intended to promote hoof-comfort and consequent hoof-wall-growth and hoof structure regeneration.

One embodiment of the invention in its broad form resides in a horseshoe which while in use is capable of accommodating splaying of the horse hoof, the horseshoe having a generally U shaped unitary body including a heel-region and including left and right body portions or branches having undersurfaces lying on a common bottom plane of the horseshoe, and a central toe area which is connected to the left and right body portions in a location away from the heel-region, the central toe area acting like a spring element and being substantially of a crescent shape including a convex outer edge and a concave inner edge, the convex outer edge being substantially in said common bottom plane, the concave inner edge in use projecting below the common bottom plane by a projection-portion, whereby when the central toe area of the horseshoe in use impacts ground, the projection-portion gets resiliently pushed vertically up thereby causing and allowing the left and right body portions of the horseshoe to splay, whereby, when the central toe area is not impacting the ground, the left and right body portions of the horseshoe are repetitively and resiliently restored to their original positions without splay. Expediently, the projection-portion referred to supra is re-formed and defined in use when a farrier prepares said horseshoe for installation. It is noted that the crescent shape of the toe area while the horseshoe is in use, forms a cavity which may be filled with a resilient compressible material with intent to prevent accumulation of dirt and debris in the cavity.

Optionally, the left and right wings, on their undersurface may have serrations or similar formations to facilitate flexing of said left and right wings in a direction substantially at right angles to the common bottom plane, whereby hoof-comfort can be enhanced. Advantageously, the horseshoe of the present invention is unitary and non-composite in construction, thereby keeping the construction simple and the cost down. A variation uses a chord-like leaf-spring member instead of the central toe area acting like a spring element.

Another embodiment resides in a generally U shaped compliant horseshoe having left and right wings and a central toe area integral with said left and right wings which lie in a common bottom plane, the central toe area being crescent shaped and attachedly bridging the left and right wings and acting as a compliant leaf-spring, the central toe area (while acting as a leaf-spring) having a first unstressed state and a second resiliently stressed state, said leaf-spring during installation-preparation of the horseshoe achieving a projection downwardly formed substantially perpendicular to the common bottom plane, which projection becomes defined and set when a farrier during installation-preparation pounds and prepares the horseshoe for installation, the leaf-spring attaining its said second stressed state upon loading of the horseshoe in use by ground impact to push the projection resiliently upwards, and thus exert consequent horizontal pressure sideways on said left and right wings so as to cause splaying of the left and right wings as desired, the crescent shaped central toe area being provided with grooves on left and right sides thereof, the leaf-spring being repetitively restored to its first unstressed state when the horseshoe in use is not loaded or not impacting ground, whereupon said left and right wings are repetitively restored to their positions without splay.

The grooves referred to supra serve to separate the crescent shaped toe area from the left and right wings, and assist in bending the left and right wings as necessary by the farrier during farrier-preparation and sizing of the horseshoe. The grooves may have a cross-sectional profile such as a V shaped profile, or alternatively semi-circular or semi-elliptical profiles, depending on the design choice. Expediently, the left and right wings, on their undersurface may have serrations to facilitate enhancing ground-grip and to assist flexing of the left and right wings in a direction substantially at right angles to the horizontal plane. It is noted that by the provision of the serrations, hoof-comfort and regeneration can be enhanced.

Another embodiment in its broad form resides in a metallic horseshoe capable of accommodating splaying of the horse hoof in use, the horseshoe in use being capable of accommodating splaying of the horse hoof, the horseshoe having a generally U shaped unitary body and including left and right body portions lying on a bottom plane of the horseshoe, and a central toe portion bridging said left and right body portions which are capable of resilient splaying, the central toe portion being generally crescent shaped and being provided with optional grooves on left and right sides thereof, the central toe portion being configured to function as a leaf-spring and having a first unstressed state and a second stressed state, the crescent shaped central toe portion having a convex edge and a concave edge which is able to form a projecting-portion projecting below the bottom plane in said first unstressed state, the central toe portion attaining its second stressed state by loading of the horseshoe which is caused when the horse shoe in use impacts ground, the projecting-portion of the leaf-spring tending to be resiliently pushed upwards in its second stressed state thereby causing the left and right body portions to splay as desired, whereby the central toe portion continually and alternately goes through its said second stressed and said first unstressed states repetitively when the horse hoof in use impacts ground and is off ground.

Expediently, the leaf-spring may have a groove on each side thereof to assist the left and right wings to be bent as necessary during installation. The grooves may have a profile chosen from semi-circular, semi-elliptical, arcuate and V-shaped profiles.

BRIEF DESCRIPTION OF THE DRAWING

A more detailed understanding of the invention may be had from the following description of preferred embodiments which are exemplary and not intended to be limiting, and to be understood in conjunction with the accompanying drawings wherein.

DETAILED DESCRIPTION OF EMBODIMENTS

Figure 1:
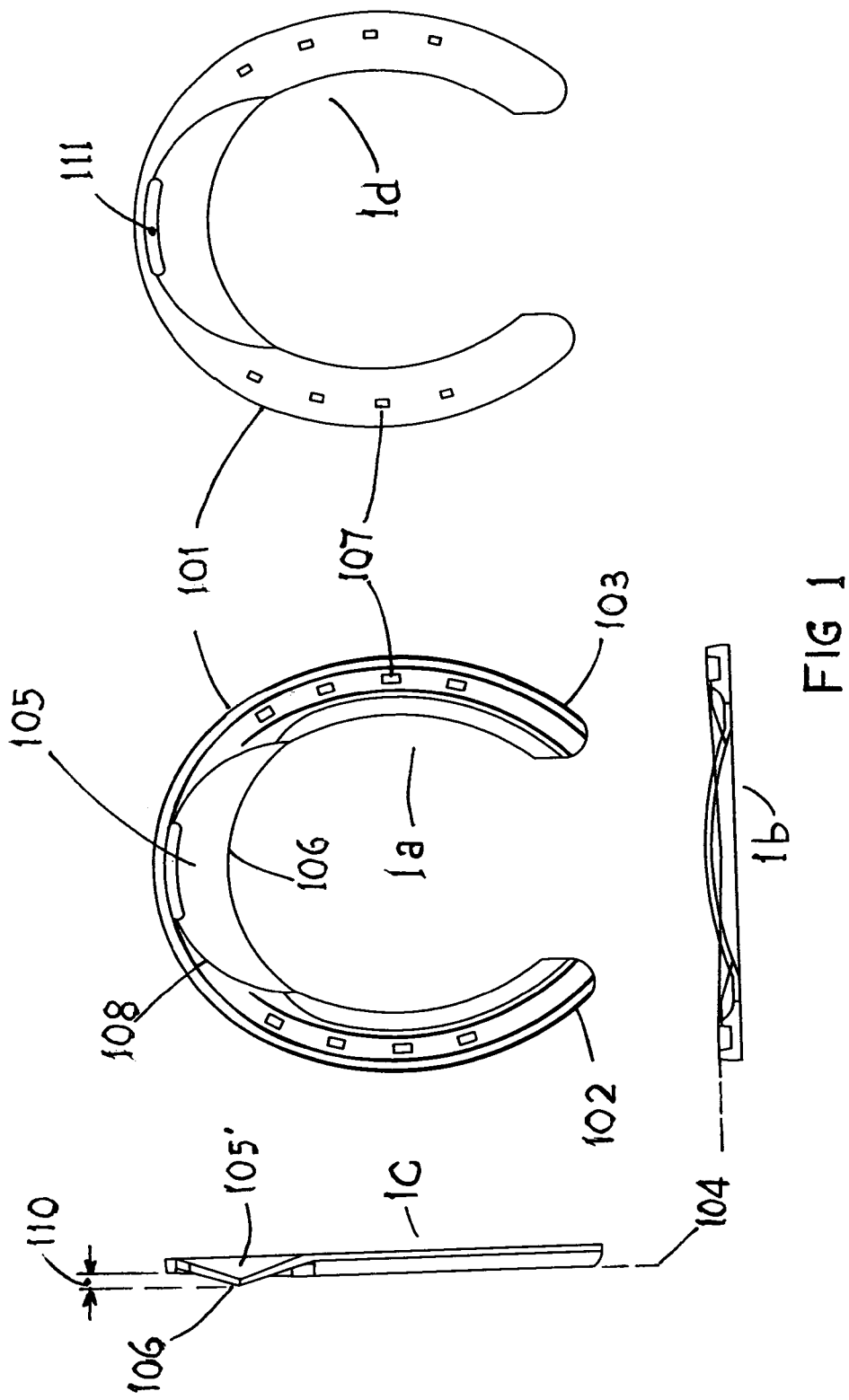
FIGS. 1a-1d of FIG. 1 illustrate a first embodiment of the invention.

A detailed description of one or more embodiments of the invention is provided below in the context of the accompanying figures that illustrate by way of example the principles of the invention. While the invention is described in connection with such embodiments, it should be understood that the invention is not limited to any particular embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention The present invention may be practiced according to the claims without some or all of these specific details. For the purpose of clarity, technical material that is known in the technical fields related to the invention has not been described in detail so that the present invention is not unnecessarily obscured.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made. The embodiments included herein are described in sufficient detail to enable those skilled in the art to practice the invention, and it is to be understood that other embodiments may be utilized including changes that may be made without departing from the scope of the present invention. The description herein is by way of example only, and is therefore not to be taken in a limiting sense, and the scope of the present invention is defined only by the appended claims and their equivalents.

Described hereinafter are embodiments of a unitary non-composite horseshoe which is preferably metallic and having a configuration intended to promote hoof-comfort and consequent hoof-wall-growth and hoof structure regeneration FIG. 1 generally shows an exemplary diagrammatic illustration of the first embodiment of the inventive horseshoe. As shown, the horseshoe includes a generally U shaped body 101 including left and right body portions 102, 103 which have an undersurface lying on a common bottom plane 104. The left and right body portions 102 and 103 are bridged by a crescent shaped toe area 105 functioning like a leaf-spring, which includes a concave inner edge 106 and a convex outer edge 108. The concave inner edge 106 includes portions which may project below the common bottom plane 104 by a projection-portion 110. When the horseshoe is loaded (such as when the horse is standing or when the hoof impact the ground during running) the central convex formation of the leaf-spring in the toe area 105 gets into its loaded state or stressed state whereupon the leaf-spring portion of the toe area 105 tends to be resiliently pushed upwards thereby enabling the left and right body portions to resiliently splay as desired. In the unstressed state of the toe area 105, the splay is absent or is reversed. Thus, the central toe area in 105 alternately and successively goes through its stressed and unstressed states when the horse hoof touches/impacts ground and is off ground respectively. It is further noted that the central convex formation creates a space or cavity between the projection-portion explained above and the underside of the horse hoof in use. Expediently, the space or cavity may be filled with a compressible (resilient) material filler 105' e.g., silicone or a suitable grade of compressible resin which when retained in place can prevent accumulation of pebbles/dirt or other hard material which might impede the leaf-spring from functioning as intended; accumulation and retention of dirt might also cause discomfort to the hoof and is undesirable. Other suitable fillers in lieu of the silicone material are within the purview of the present invention. The silicone material/resin may be placed in the space/cavity either at the time the horse shoe is manufactured or by the fathers during the installation of the horseshoe. It is envisaged that the resilience of the silicone foam material will not impede resilient upward deformation of the leaf-spring as explained above, but permits splaying of the left and right body portions of the horse shoe. The inventive horseshoe is fastened/installed into position on the hoof by nails placed in the nail holes 107. Other fasteners in lieu of nails may be used instead, as intelligible to those skilled in the art.

Optionally, the first embodiment may have the following features:

The convex outer edge in the first embodiment may have its ends substantially in level with the common bottom plane, and the projection-portion occurs at substantially a center region of the concave inner edge. The projection-portion during its resilient deformation determines the magnitude of splay of the left and right body portions. The central toe area of the horseshoe may be integral with the left and right body portions, or may be joined to the left and right body portions by welding, brazing, or mechanical joining. Alternatively, the entire horseshoe may be obtained by forging or casting, or a combination of casting and forging, or by welding.

The horseshoe might comprise an alloy material such as for example hardened spring steel 17-4 PH or any other suitable grade, e.g., cast/forged spring steel alloy, or nonferrous material such as for example, Titanium. The central toe area of the horseshoe may be obtained by a separate forging operation. Alternatively, the central toe area, and left and right body portions may all be cast together (with optional forging followed) from material chosen from a group comprising Titanium, or spring steel alloy or any desired grade of spring steel, e.g., heat-treated spring steel, or hardened spring steel 17-4 PH.

As a variation, the central toe area of the horseshoe might include an elongated recess 111 adjacent the convex outer edge. Preferably, the central toe area is devoid of nail-holes 107 which may be generally limited to the left and right body portions of the horseshoe.

In a second embodiment, the invention provides a generally U shaped compliant horseshoe having left and right wings and a central toe area integral with the left and right wings and including an optional open recess facing the left and right wings, the horseshoe including a compliant chord-like leaf-spring disposed proximate to the central toe area, but not at the central toe area, and attachedly bridging said left and right wings. An example of the second embodiment may be seen in FIG. 2. As shown, this embodiment includes a generally U shaped body 201, including left and right wings 202 and 203 lying on a common undersurface plane 204. A compliant leaf-spring 205 which is chord-like and preferably integral with the body 201 bridges the left and right wings and resiliently bows in its normal unstressed state below the state below the undersurface plane 204 by a projection-dimension 210. Advantageously, the horseshoe may be made integral with the leaf-spring 205 which is disposed proximate the central toe area where an open recess 206 is located. The leaf-spring has a first (normal) unstressed state and a second stressed state, the leaf-spring attaining its second stressed state upon loading/impacting of the horseshoe in use by ground-impact/contact. It is also envisaged that the horseshoe of this embodiment may initially be manufactured without the projection-dimension 210, (i.e., initially, the chord-like leaf-spring is made to be substantially in the same plane as the left and right wings,) so long as the projection-dimension 210 can be subsequently formed and set during farrier-preparation of the horseshoe during sizing of the horseshoe before installation. In any case, the projection-dimension 210 is desirable for the horseshoe to function as intended. In its second stressed state, the leaf-spring 205 is resiliently deformed vertically upwards of the undersurface plane 204, thus exerting horizontal pressure sideways on the left and right wings so as to cause the left and right wings to resiliently splay as desired. The leaf-spring can be restored to its first unstressed state reversing or undoing the splay when the horseshoe in use is not loaded or is not touching ground in use. Thus, each time the horseshoe impacts the ground, or each time when the horseshoe is loaded by the horse simply putting its weight on the horseshoe, the leaf-spring gets into its second stressed state and causes the left and right wings 202 and 203 to splay resiliently. During moments when the horseshoe is not loaded, such as when the hoof is above the ground momentarily during the running motion of the horse, the splay is undone. In all the embodiments described herein, the cyclic splay and the lack of splay of the horseshoe conform to the natural hoof-loading, thus enhancing hoof-comfort. The provision of the open recess 206 assists the splay-response of the left and right wings 202 and 203. Nail holes 207 enable fastening of the horseshoe to the hoof. Alternative methods of fastening the horseshoe to the hoof are within the ambit of this invention, and will be intelligible to those skilled in the art.

Figure 3:
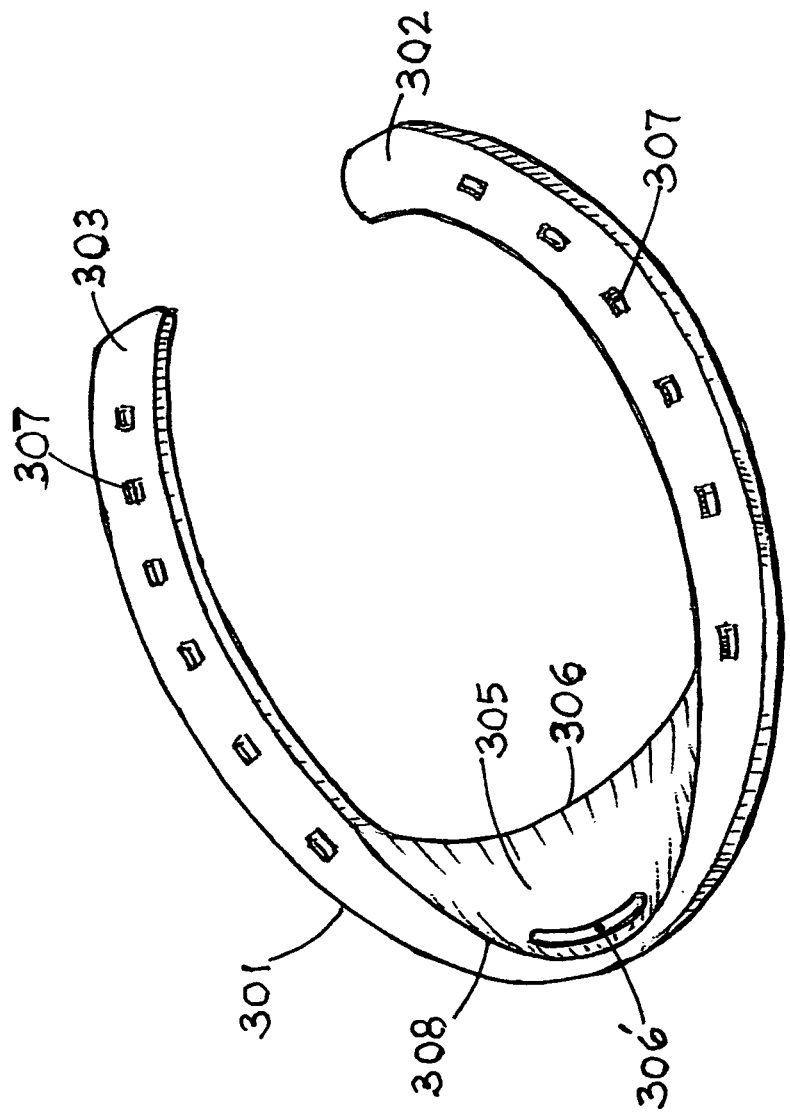
FIG. 3 illustrates a pictorial view of the first embodiment of the present horseshoe; and, FIGS. 4a-4d of FIG. 4 illustrate views of a third embodiment of the inventive horseshoe which is provided with features offering splaying, and additionally including serrations which allow flexibility of left and right portions of the horseshoe in a vertical plane as needed.

FIG. 3 pictorially illustrates an embodiment largely similar to the one illustrated in FIG. 1. The FIG. 3 embodiment provides a horseshoe capable of accommodating splaying of a horse hoof in use, the horseshoe having a generally U shaped body 301 including a heel-region and including left and right body portions 302, 303, having undersurfaces lying on a common bottom plane (—not shown—) of the horseshoe, and a central toe area 305 connected to the left and right body portions 302, 303 of the U shaped body 301 in a location away from the heel-region, the central toe area 305 acting like a spring element and being generally of a crescent shape including a convex outer edge and a concave inner edge. The central toe area 305 has a convex edge 308 and a concave inner edge 306 and an optional arcuate aperture 306' and an optional slit in the front of the central toe area. The illustration in FIG. 3 shows the arcuate aperture 306', but not the slit. The slit preferably extends from the inside of the aperture 306' to the front of the central toe area. The convex outer edge 308 of the central toe area 305 is substantially in said common bottom plane, and the concave inner edge 306 projects below the common bottom plane by a chosen designed dimension (similar to the dimension 110 in FIG. 1), whereby when the central toe area of the horseshoe in use impacts ground, the central toe area acts like a spring element causing spring action. The concave inner edge 306 of the central toe area 305 resiliently flattens because of the spring action by being resiliently pushed up when the toe area of the horseshoe hits or impacts the ground in use, thereby allowing the left and right body portions to resiliently splay. It is noted that when the central toe area is not impacting/touching the ground, the left and right body portions are restored to their original positions without splay. The splaying action could be continually transient when the horse is racing, but the splaying may not be transient when the horse is standing in its stall. The hoof loading/impact resiliently alters the dimension by which the concave inner edge 306 remains projected below the common bottom plane. The loading and the initial projection influence the degree of the spring action which in turn controls the degree of splaying. The splaying action as described herein is necessary and desirable to alleviate stresses caused by the hoof-impact with the ground when the horse is racing. The degree of impact may be assessed by the designer by taking into account the parameters including the horse's hoof size, the horse's weight range, envisaged maximum ground speed, the hardness of ground and the modulus of elasticity of the horseshoe material, to ascertain the maximum extent of splaying which can be obtained. Those skilled in the art are aware that when a race horse runs on a race-track at 30-40 miles an hour, the entire hoof-impact duration can be of the order of milliseconds, and it is thus desirable to deliberately cause and assist a predetermined degree of splaying of the left and right body portions of the horseshoe during the hoof-impact duration. The present invention aims at achieving the splaying without complicated gadgetry in the horseshoe or without the use of any composite materials constituting the horseshoe. The present design thus permits splaying of the left and right body portions of the horseshoe by resorting to a simple, reliable and cost effective design of the horse shoe.

Figure 4:
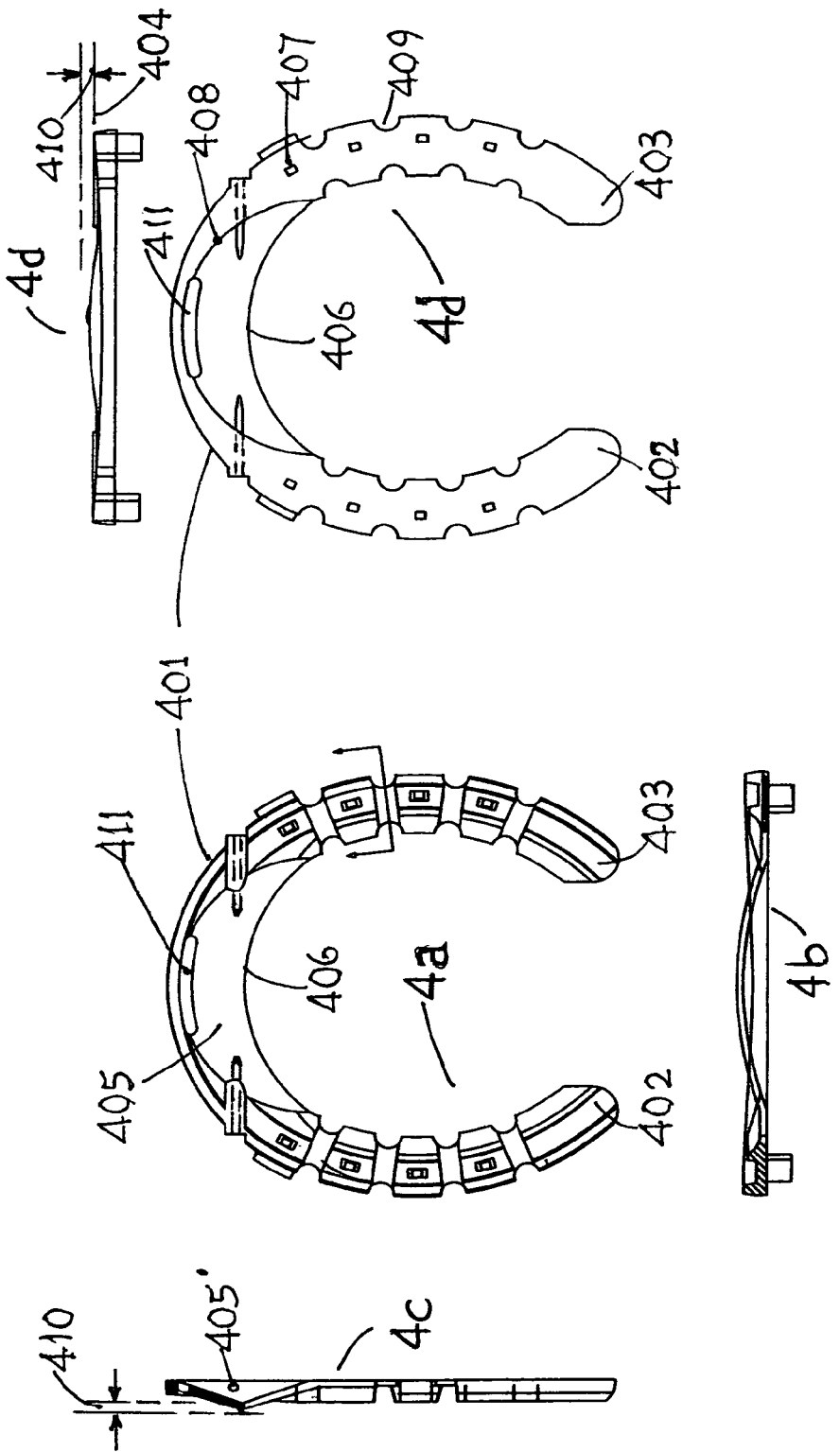

Another horseshoe embodiment illustrated in FIG. 4 by way of example includes serrations that enable relative flexibility between the right and left wings whereby in a flexed state of the horseshoe, the right and left wings thereof may not be co-planar. Again, this kind of flexibility provided for in this embodiment has been found in to be desirable in promoting hoof comfort and hoof-structure-regeneration. The horseshoe illustrated in FIG. 4, includes a generally U shaped unitary body 401 having left and right body portions 402 and 403 lying at rest on a common bottom plane 404, and bridged by a toe area 405. The serrations may have a configuration as shown at 409 and may be selectively provided on the convex and concave sides of the left and right wings, as well as the undersurface of the horseshoe. The serrations provided on the undersurface of the horseshoe serve to enhance the ground-grip for a horse which is affixed with the inventive horseshoe. The serrations 409 may be provided contiguously, starting from said central toe area and proceeding towards open ends of said U shaped body. The serrations typically may be so dimensioned as to reduce the rigidity level of the left and right wings to allow flexibility. With or without the serrations, the toe area (405) leaf-spring along with the silicone filler in use functions in such a manner that the resilient deformation of the leaf-spring causes the left and right wings of the horseshoe to splay by a desired amount. As aforesaid, the splaying provision, particularly as assisted by the provision of the grooves (not illustrated in FIG. 4) on either side of the leaf-spring, enhances hoof comfort and hoof regeneration.

Desirably, the flexible horseshoe of the invention might include the leaf-spring, the serrations and the silicone/resin filler, so as to combine all the desirable features in one embodiment. Other alternative structural features in lieu of the serrations to provide flexibility between the left and right wings are also within the ambit of the present invention. For example, notches may take the place of the serrations. The horse shoe may be secured in place for deployment, using nails in the nail-holes 407. Upon ground impact or when the horseshoe is loaded, the toe area 405 resiliently deforms to the extent permitted by the dimension 410, to exert pressure sideways on the left and right (wings) body portions 402, 403 to cause them to splay apart resiliently. As in the embodiment of FIG. 1, the toe area 405 of the configuration of the horseshoe illustrated in FIG. 4 includes a concave inner edge 406 and a convex outer edge 408. The inner edge 406 in use projects below the undersurface 404 by a projection-portion 410. Optionally, the toe area may include a slot or an elongated recess 411.

The toe area 405 shown in FIG. 4 forms a cavity in use which may be filled with a resilient compressible material 405' such as the silicone or compressible resin which assists in preventing accumulation of pebbles, dirt, debris and other such material from compacting inside the cavity or space referred to above. Compaction of extraneous material such as pebbles inside the space or cavity is inconducive to the functioning of the leaf-spring as intended, and might impede the splaying of the left and right wings of the horseshoe. Other compressible inert materials for fillers in lieu of Silicone or resin are also acceptable.

Figure 5:
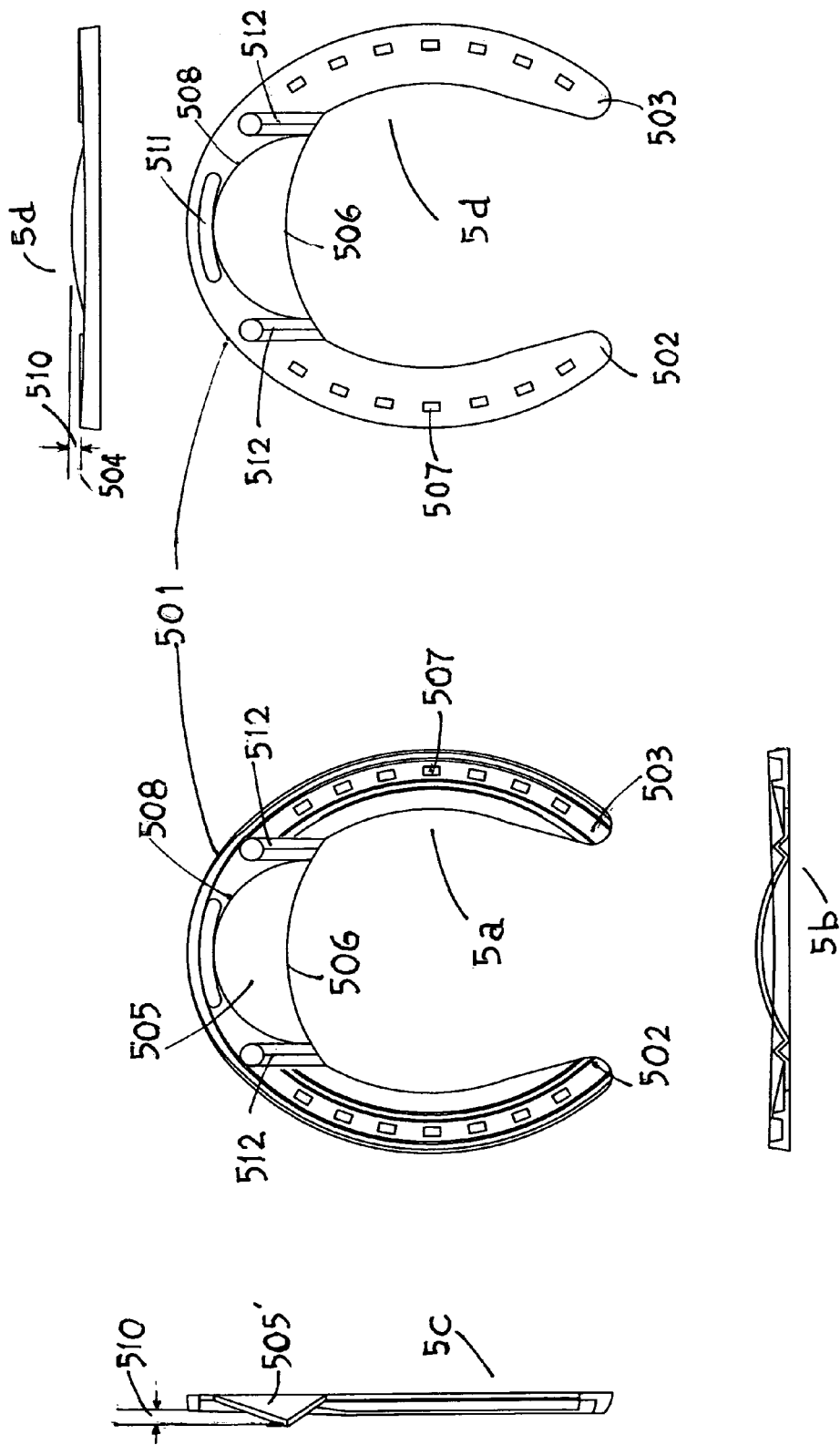
FIGS. 5a-5d of FIG. 5 illustrate pictorial views of an embodiment including grooves, and showing a projection-portion of the crescent shaped central toe area; and, FIGS. 6a-6d of FIG. 6 illustrate pictorial views of an embodiment including grooves, wherein a projection-portion of the crescent shaped central toe area may not clearly be formed during the initial manufacture, but gets formed and defined during the horseshoe installation by the farrier, prior to use.

FIG. 5 illustrates an embodiment similar to the one illustrated in FIG. 1, but including grooves on either side of the toe area. The embodiment illustrated in FIG. 5 includes a generally U shaped body 501, left and right body portions 502 and 503, the toe area 505, concave inner edge 506 of the toe area, convex outer edge 508 of the toe area, filler material 505', and the projection-portion 510. Further illustrated in FIG. 5 are grooves 512 disposed one on each side of the central toe portion. The grooves separate the toe area 505 from the left and right body portions 502, 503. As shown, the grooves have generally a cross section with a V shaped profile, and extend substantially in the direction towards the heel of the horseshoe, but it is noted that slight variations in the direction of the length of the grooves are within the ambit of the invention. As an alternative to the V shaped profile, the profile of the groove may be chosen from a profile-group comprising semi-circular, semi-elliptical, square and rectangular profiles, depending on the choice of the designer. Optionally, as in the embodiment of FIG. 1, an elongated recess 511 may be provided at the front of the toe area.

Figure 6:
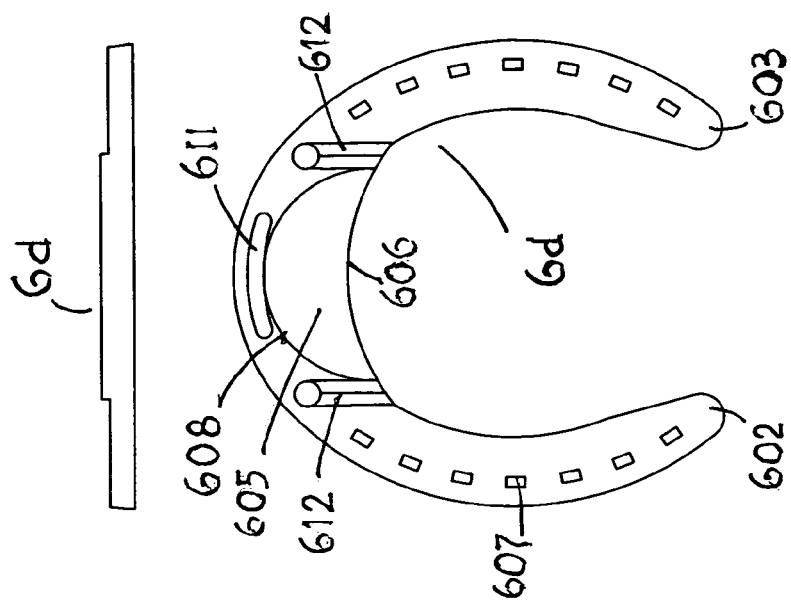
Figure 6:
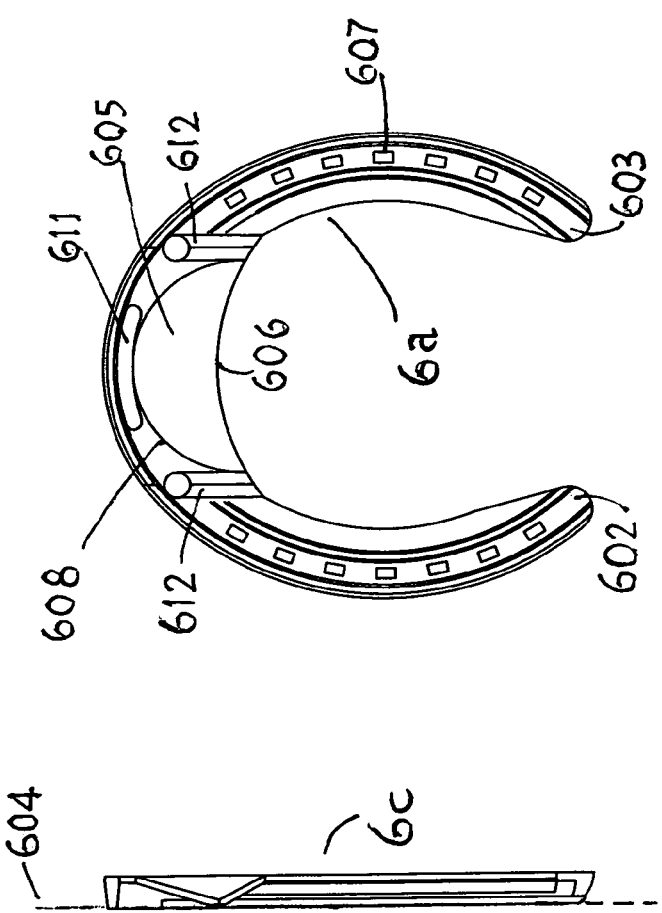
Figure 6:
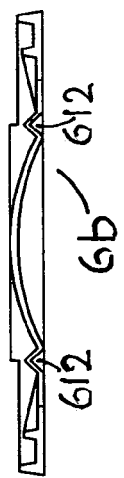

FIG. 6 generally illustrates yet another embodiment where notably the concave inner edge 606 of the toe area 605 is initially substantially in the level of the bottom plane 604. Notwithstanding, it is noted that in use, the concave inner edge 606 gets pushed below the bottom plane to form and define the required projection-portion 610 when the farrier during installation-preparation pounds the horseshoe in order to do the sizing. In other words, the projection-portion 610 is permanently defined in use, by the farrier. The parts illustrated in FIG. 6 include a generally U shaped body 601, left and right body portions 602 and 603, the toe area 605, concave inner edge 606 of the toe area, convex outer edge 608 of the toe area, filler material 605', and the projection-portion 610. Further illustrated are grooves 612 disposed one on each side of the central toe portion. As shown, the grooves generally have a cross section with a V shaped profile, and extend generally in the direction towards the heel of the horseshoe, but it is noted that slight variations in the direction of the length of the grooves are within the ambit of the invention. The profile of the groove may alternatively be chosen from a group comprising semi-circular, semi-elliptical, square and rectangular profiles, depending on the choice of the designer. Optionally, as in the embodiment of FIG. 1, an elongated recess 611 may be provided at the front of the toe area.

Figure 2:
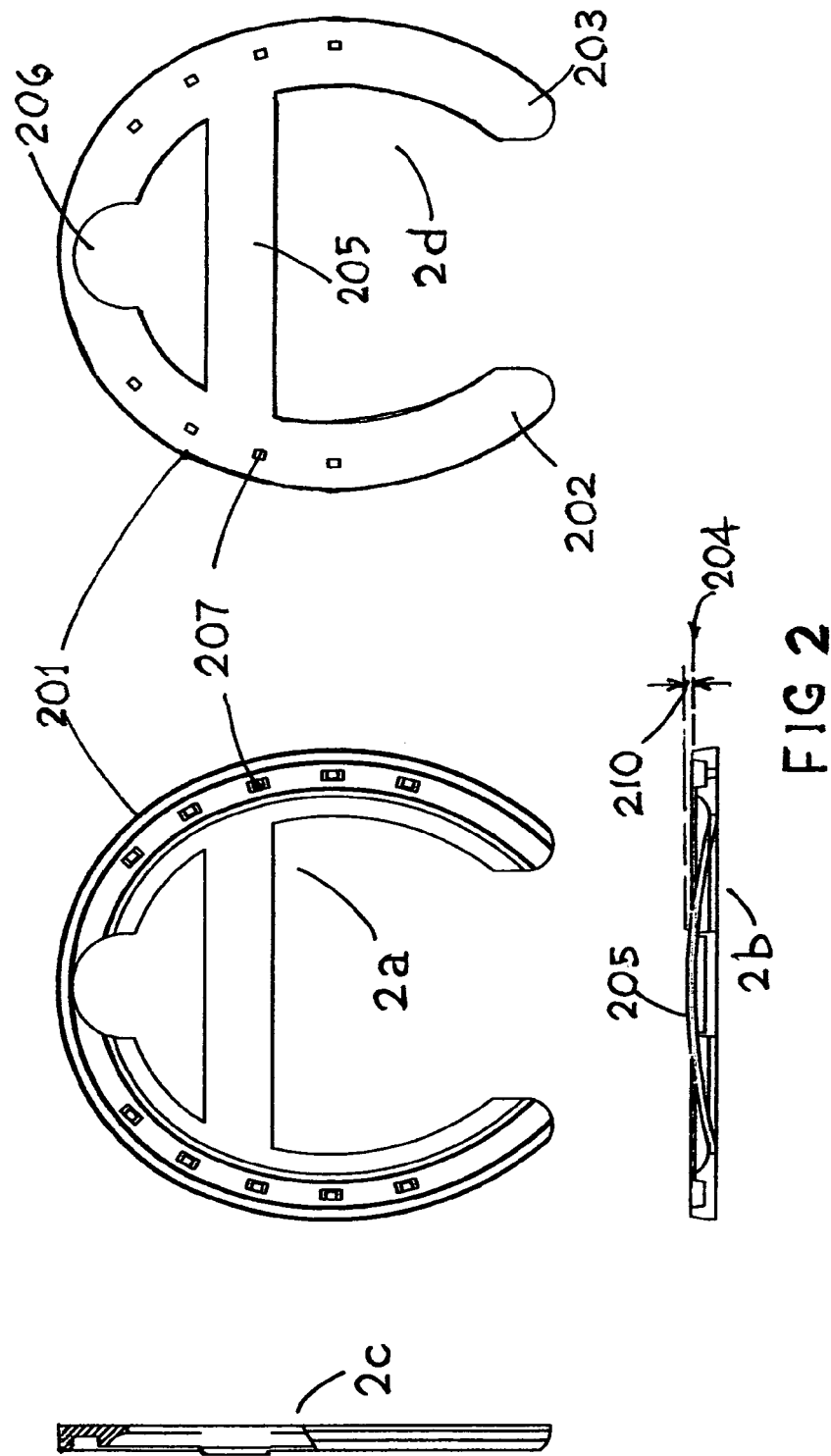
FIGS. 2a-2d of FIG. 2 illustrate a second embodiment of the invention.

It is further to be noted that where the sizing of the horseshoe or other significant installation-preparation may not be intrinsically necessary, the farrier would pick up a horseshoe which is illustrated in any of FIGS. 1-3, or the version in FIG. 4 with serrations. It is understood that with the embodiment illustrated in FIG. 6, installation-preparation by the farrier for the horseshoe might be desirable in order for the horseshoe to function as required herein, whereby splaying of the left and right body portions is caused as desired.

In all the above embodiments, it is to be noted that splaying of the left and right body portions is caused by the resilient action of the central toe portion or the resilient action of the leaf-spring, as the case may be. It is further to be noted that action of accommodating splaying per-se by the horseshoe is not the same as the action of causing the splaying. In the present invention, splaying is caused by the construction and function of the inventive horseshoe, and additionally, the present horseshoe construction also accommodates splaying. Further, in any of the above embodiments, the generally U shaped body of the horseshoe could comprise a single piece which is obtained by any process chosen from forging, casting, blanking, welding, brazing or a combination of casting and forging. Other methods of obtaining the U shaped body are within the purview of the invention. As aforesaid, in one embodiment, the horseshoe includes a chord-like leaf-spring member which causes the left and right body portions of the horse shoe to resiliently splay as desired The horseshoe might comprise a U shaped body obtained by a forging operation using precipitation hardened spring steel 17-4 PH. Alternatively, the U shaped body may comprise Titanium.

In one embodiment, serrations/notches are provided on an undersurface of the left and right body portions. In a preferred variation, serrations are provided on arcuate sides of said left and right body portions as well as on an undersurface of said left and right body portions Advantageously, the central toe portion of the horseshoe may include an arcuate configuration (with a convex outer edge and a concave inner edge) formed contiguously with the left and right body portions/wings, the central convex formation being located along said concave inner edge. In a preferred embodiment, the central toe portion includes an arcuate elongated aperture substantially in a middle portion of the convex outer edge.

For affixing the horseshoe to the horse hoof, the left and right body portions may include a plurality of nail-holes for driving nails in a direction substantially perpendicular to the bottom plane, and the central toe portion may include a provision for inserting nails in a direction parallel to the bottom plane. It is also noted that the concave inner edge in use projects below said bottom plane by a projection-portion, which decides the degree of splaying, taking into account material properties of the horseshoe metal and an average value of envisaged hoof loading. It is further noted that the present invention includes an embodiment where the projection-portion may not be predominant or even visible at the time of manufacture of the horseshoe, but may be formed and defined when the farrier hammers the horseshoe before installation to make the horseshoe conform to the size-requirements for the horse for which the shoe is to be installed. As aforesaid, the projection-portion, in use, assists the central toe portion to resiliently deform to cause and enable the splaying of the left and right wing portions. Additionally, the grooves on either side of the central toe portion (vide FIG. 5 grooves 512, FIG. 6 grooves 612) separate the toe portion from the left and right wings, and also facilitate the bending action of the left and right body/wing portions during the farrier-preparation of the horseshoe prior to installation.

In all the embodiments and their modifications in the present inventions, the material for the horseshoe might comprise suitable metallic material chosen from Titanium, Spring steel alloy, or ferrous material such as a suitable grade of steel, or spring steel e.g., hardened spring steel 17-4 PH.

Preferred embodiments described above selectively offer one or more of the following advantages:

1. The preferred embodiment of the inventive horseshoe as described is of unitary construction, not composite, and requires no assembly, and accordingly eliminates additional assembly costs.

2. The preferred embodiment being of unitary-construction, may be mass produced by forging, casting, blanking or a combination thereof, the mass production serving to lower the manufacturing costs.

3. The inventive horseshoe is metallic, and lasts at least as long as other prior art metallic horseshoes.

4. The inventive horseshoes when offered in precipitation hardened spring steel 17-4 PH are rustproof and more desirable than prior art metallic ferrous based horseshoes.

5. The splaying action caused by the resilient action of the leaf-spring (or spring element) in all the embodiments provides significant hoof-comfort and improved blood circulation in the hoof area, thereby promoting hoof-regeneration.

6. The serrations provided selectively on the undersurface of the horseshoe serve to enhance the ground-grip for the horseshoe in use.

7. The serrations selectively provided in the side regions of the left and right wings, as well the undersurface of the left and right wings are conducive to create flexing of the horseshoe in a vertical direction at right angles to the undersurface, thus enhancing hoof comfort. The optional grooves provided selectively at either side of the central toe portion facilitate the bending of the left and right wings during sizing of the horseshoe by the father (farrier-preparation).

In the foregoing detailed description of embodiments of the invention, various features may have been grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" where present, are used as the plain-English equivalents of the respective terms "comprising" and "wherein," respectively. Moreover, the terms "first," "second," and "third," etc., if used, are used merely as labels, and are not intended to impose numerical requirements on their objects.

The invention claimed is:

1. A horseshoe that when in use is capable of accommodating splaying of a horse hoof, said horseshoe being monolithic in structure and comprising a generally U shaped unitary single piece solid metal body including a heel-region and including left and right branches having metallic undersurfaces lying on a common bottom plane of the horseshoe, and a central toe area, said central toe area including a crescent shaped spring element that includes a convex outer edge and a concave inner edge, said spring element having resilience in a vertically upward direction that is perpendicular to said common bottom plane, said convex outer edge being substantially in said common bottom plane, said concave inner edge in use projecting below said common bottom plane by a projection-portion having a chosen design dimension which upon the horseshoe in use impacting ground, gets resiliently pushed vertically upwards to deliberately cause and allow said left and right branches of the horseshoe to splay, whereby, when said central toe area is not impacting the ground, said left and right body branches of the horseshoe tend to be repetitively and resiliently restored to their original positions without splaying.

2. The horseshoe as in claim 1, wherein said concave inner edge has end portions that are substantially level with said common bottom plane and wherein said projection-portion has a maximum point below said common bottom plane at substantially a central region of said concave inner edge.

3. The horseshoe as in claim 1, wherein said projection-portion becomes defined when a farrier prepares said horseshoe for installation, and wherein said crescent shaped spring element of said toe area while the horseshoe is in use forms a cavity with an underside of said horse hoof, which cavity is filled with a resilient compressible material to prevent accumulation of dirt and debris in said cavity.

4. The horseshoe as in claim 1 wherein said central toe area is integral with said left and right branches and is provided with grooves on left and right sides of said central toe area, and wherein said left and right branches include serrations, said serrations assisting relative flexibility and bending of said left and right branches, said grooves assisting in bending of the left and right branches during sizing of the horseshoe by a farrier during installation.

5. The horseshoe as in claim 4 wherein said central toe area is formed by an operation chosen from forging, casting, welding, brazing, a combination of casting and forging, and mechanical joining, and wherein said grooves have a cross section chosen from the group consisting of semi-circular, semi-elliptical, arcuate and V shaped profiles.

6. The horseshoe as in claim 3 wherein said central toe area and left and right branches are all integral in a single piece, and said resilient compressible material comprises silicone, wherein the horseshoe is made of hardened spring steel 17-4 PH.

7. The horseshoe as in claim 4 wherein said serrations are provided starting from said central toe area and proceeding towards open ends of said U shaped body, and wherein said central toe area includes an elongated recess adjacent said convex outer edge, and wherein the horseshoe comprises spring steel.

8. A monolithic generally U shaped compliant unitary single-piece solid metal horseshoe having left and right branches and a central toe area integral with said left and right wings which lie in a common bottom plane, said central toe area including a crescent shaped spring element with a concave edge and bridging said left and right branches and acting as a compliant leaf-spring with upward vertical resilience, said leaf-spring being capable of having a first unstressed state and a second resiliently stressed state, said leaf-spring having a projection of a chosen design dimension formed at said concave edge substantially perpendicular to and projecting below said common bottom plane, said leaf-spring attaining its said second stressed state upon loading of the horseshoe in use by ground impact to push said projection resiliently upwards, said leaf spring in its second stressed state exerting resilient horizontal pressure sideways on said left and right branches so as to deliberately cause splaying of said left and right branches as desired, said leaf-spring tending to be repetitively restored to its first unstressed state when the horseshoe in use is not loaded or not impacting ground, whereupon said left and right branches are restored to their positions prior to splaying.

9. A horseshoe capable of accommodating splaying of a horse hoof in use, said horseshoe being monolithic in structure and comprising a generally U shaped unitary single-piece solid metal body and including left and right branches lying on a bottom plane of the horseshoe, and a central toe portion integrally bridging said left and right branches which are capable of resilient splaying, said central toe portion including a generally crescent shaped leaf-spring capable of having a first unstressed state and a second stressed state, said crescent shaped leaf-spring having a convex edge and a concave edge, said concave edge having a projecting-portion equal to a chosen design dimension and projecting below said bottom plane in said first unstressed state, said generally crescent shaped leaf-spring attaining its said second stressed state by loading of the horseshoe when the horseshoe in use impacts ground, said projecting-portion of the leaf-spring being resiliently pushed upwards to reach its said second stressed state to deliberately cause said left and right branches to splay as desired, whereby said central toe portion continually and alternately goes through its said second stressed and said first unstressed states repetitively when the horse hoof in use impacts ground and is off ground.

10. The horseshoe as in claim 9 wherein said generally U shaped unitary metal body is obtained by at least one process chosen from the group consisting of forging, casting, a combination of casting and forging, blanking, welding or brazing, said left and right portions of the horseshoe further including serrations in said unitary metal body to allow relative flexibility between said left and right branches in a direction substantially perpendicular to said bottom plane, said central toe portion being provided with grooves on left and right sides thereof to facilitate bending of said left and right branches during farrier-preparation of the horseshoe to size the horseshoe before installation as required.

11. The horseshoe as in claim 10 wherein said generally U shaped unitary metal body comprises forged precipitation hardened spring steel 17-4 PH.

12. The horseshoe as in claim 9 wherein said generally U shaped unitary metal body comprises titanium.

13. The horseshoe as in claim 10, wherein said serrations are provided on an undersurface of said left and right branches in said bottom plane, and wherein said grooves each have a profile chosen from semi-circular, semi-elliptical, arcuate and V-shaped profiles.

14. The horseshoe as in claim 10, wherein said serrations are provided on arcuate sides of said left and right branches as well as on an undersurface of said left and right branches, and wherein said grooves each have a profile chosen from semi-circular, semi-elliptical, arcuate and V-shaped profiles.

15. The horseshoe as in claim 10, wherein said projecting-portion has a maximum dimension at a center location of said concave edge.

16. The horseshoe as in claim 15, wherein said central toe portion includes an arcuate elongated aperture substantially in a middle portion of said central toe portion, and wherein said crescent shaped leaf-spring in use forms a cavity with an undersurface of said horse hoof in an installed horseshoe, which cavity is filled with a resilient compressible material to obviate accumulation of dirt and debris in said cavity.

17. The horseshoe as in claim 16, wherein said left and right branches include a plurality of nail-holes for driving nails in a direction substantially perpendicular to said bottom plane, and wherein said central toe portion includes a provision for inserting nails in a direction parallel to said bottom plane.

18. The horseshoe as in claim 17, wherein said grooves each have a substantially V shaped profile.

19. A horseshoe which when in use is capable of accommodating splaying of a horse hoof, said horseshoe being monolithic in structure and comprising a generally U shaped unitary solid metal body including a heel-region and comprising left and right branches having undersurfaces lying on a common bottom plane of the horseshoe, and a central toe area which is integral with said left and right branches in a location away from said heel-region, said central toe area including a single integral crescent shaped spring like element with resilience in a vertically upward direction, said crescent shaped spring like element having a convex edge and a concave edge that includes a projection-portion of a chosen design dimension projecting below said common bottom plane, said projection-portion being resiliently pushed vertically upwards when the horse hoof with the horseshoe in use impacts ground, deliberately causing and allowing said left and right branches of the horseshoe to splay, whereby, when said horseshoe and said crescent shaped spring like element are not impacting the ground, said left and right branches of the horseshoe are repetitively and resiliently restored to their original positions without splaying.

* * * * *